Figure 1:
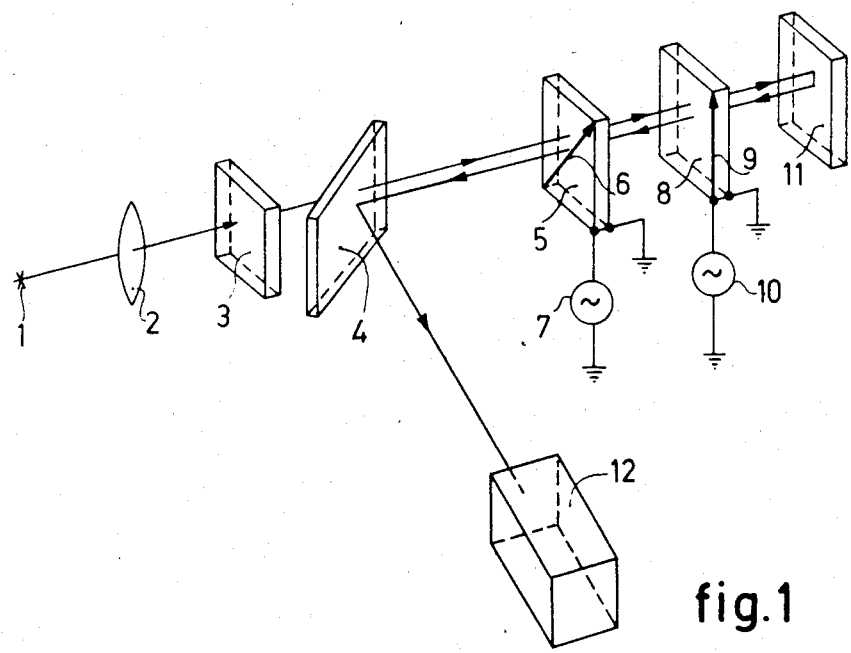

United States [11] 3,630,595

[72] Inventor Theodorus Hendrikus Peek
 Emmasingel, Eindhoven, Netherlands
[21] Appl. No. 7,634
[22] Filed Feb. 2, 1970
[45] Patented Dec. 28, 1971
[73] Assignee U.S. Philips Corporation
 New York, N.Y.
[32] Priority Feb. 3, 1969
[33] Netherlands
[31] 6901722

[54] APPARATUS FOR CONVERTING LINEARLY POLARIZED RADIATION INTO LINEARLY POLARIZED RADIATION HAVING A PLANE OF POLARIZATION VARYING LINEARLY WITH TIME
 3 Claims, 2 Drawing Figs.

[52] U.S. Cl.................................................. 350/150, 350/157
[51] Int. Cl........................................................ G02f 1/26
[50] Field of Search............................................. 350/150, 160, 157

[56] References Cited
 UNITED STATES PATENTS
3,239,671 3/1966 Buhrer ......................... 350/150
3,432,223 3/1969 Uchida......................... 350/150

OTHER REFERENCES

Takasaki, " Photometric Measurement of Polarized Light by Means of ADP Polarization Modulator I" J.O.S.A. Vol. 51, No. 4 (Apr. 1951) pp. 462-463

Takasaki, " Photometric Measurement of Polarized Light by Means of ADP Polarization Modulator II" J.O.S.A. Vol. 51, No. 4 (Apr. 1961) p. 463

*Primary Examiner*—David Schonberg
*Assistant Examiner*—Paul R. Miller
*Attorney*—Frank R. Trifari ABSTRACT: An improved apparatus for converting linearly polarized radiation having an arbitrary plane of polarization into linearly polarized radiation in which the orientation of the plane of polarization changes linearly as a function of time from the initial arbitrary orientation is discussed, in which apparatus the radiation passes at least thrice through a birefringement element, at least one of the elements traversed being an electro-optical crystal.

It is shown that by using a retrodirective element the number of birefringement elements can be reduced and also the voltage to be applied to the electro-optical crystals can be considerably lower.

PATENTED DEC 28 1971 3,630,595

INVENTOR.
THEODORUS H. PEEK

BY

AGENT

APPARATUS FOR CONVERTING LINEARLY POLARIZED RADIATION INTO LINEARLY POLARIZED RADIATION HAVING A PLANE OF POLARIZATION VARYING LINEARLY WITH TIME

"An apparatus for converting linearly polarized radiation having an arbitrary plane of polarization into linearly polarized radiation the orientation of the plane of polarization of which varies linearly with time."

The invention relates to an improved apparatus for converting linearly polarized radiation having an arbitrary plane of polarization into linearly polarized radiation the orientation of the plane of polarization of which varies linearly with time from the initial arbitrary orientation, in which apparatus the radiation passes at least thrice through a birefringent element, at least one of the elements traversed being an electro-optical crystal, while the relative orientations of the elements and the electric voltages applied to the crystals have been suitably chosen.

Such an apparatus has been proposed in U.S. Pat. No. 3,558,215, FIGS. 1 and 4 of which each show an embodiment. A disadvantage of the apparatus shown in FIG. 1 of the said application is that it requires three electro-optical crystals and comparatively high voltages. To the middle crystal there is applied a voltage having an amplitude which is twice that of the voltage applied to each outer crystal. The apparatus shown in FIG. 4 has the disadvantage that the voltage applied to the crystal is comparatively high.

It is an object of the present invention to provide an improved apparatus of the kind described in the above-mentioned patent application. The improvement consists in that a series arrangement of birefringent elements is followed by a retrodirective element so that the radiation emerging from the series arrangement after being reflected traverses the series arrangement in the opposite direction. Thus, the series arrangement needs only comprise at least two birefringent elements. In addition, the voltage applied to the crystals can be lower.

Figure 2:
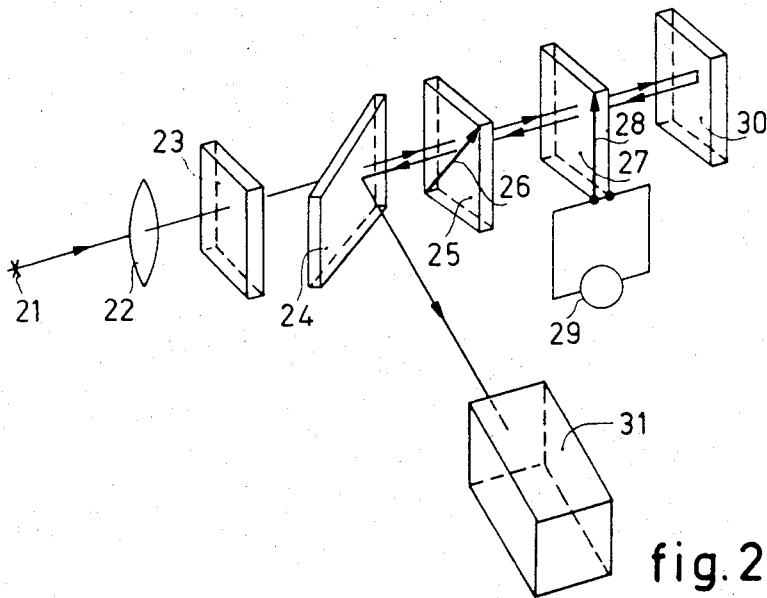

The invention will be described with reference to the accompanying diagrammatic drawing, in which:

FIGS. 1 and 2 show, by way of example, embodiments of apparatuses according to the invention.

In FIG. 1 natural radiation emitted from a source 1 of radiation is collimated by a lens 2 and converted by a polarizer 3 into linearly plane polarized radiation. For simplicity only one ray of the beam of radiation is shown. After passing through a semitransparent mirror 4 the plane polarized radiation passes through the series arrangement of two electro-optical crystals 5 and 8 which exhibit the Pockels effect and the principal directions of which, which are indicated by arrows 6 and 9, are at an angle of 45° to one another.

An alternating voltage $V_1 = V \sin\omega t$ from an alternating voltage source 7 is applied to the crystal 5, and an alternating voltage $V_2 = V' \cos\omega t$ from an alternating voltage source 10 is applied to the crystal 8. The voltages $V_1$ and $V_2$ are applied so that the electric fields generated by them in the crystals 5 and 8 respectively are parallel to the direction of propagation of the light in the respective crystal.

The radiation emerging from the crystal 8 is reflected at a plane mirror 11. The radiation then passes through the crystals 8 and 5 in the opposite direction and is reflected by the semitransparent mirror 4 to a photoelectric detection system 12. In the drawing the beam reflected at the mirror 11 has again been shown by one ray which for clarity had been shifted relative to the ray incident on the mirror 11.

The amplitude V of the voltage applied to the crystal 5 is such that linearly polarized radiation incident on the crystal 5 is converted into circularly polarized radiation, for the value of V is chosen to be such that a phase difference of a quarter wavelength is produced between two oscillations which are created from linearly polarized light when it passes through the respective crystal.

The amplitude V' of the voltage applied to the crystal 8 is chosen to be such that a phase difference of a half wavelength is produced between the two oscillations which are created from linearly polarized light when it passes through the crystal 8 at a voltage of 2 v'.

Since the birefringence of an anisotropic element, in particular an electro-optical crystal, is linearly added after reflection of the radiation traversing the element, the crystals 5 and 8 together with their respective mirror images with respect to the reflector 11 may each effectively be considered as one crystal.

The apparatus shown in FIG. 1 has the same properties as that shown in FIG. 1 of the U.S. Pat. No. 3,558,215 for the crystal 5 of the new arrangement corresponds to the crystal 4 of the main application, the crystal 8 together with its mirror image corresponds to the crystal 5, and the mirror image of the crystal 5 corresponds to the crystal 6 of the main application.

However, the amplitude of the voltage applied to the crystal 8 is only one half of that applied to the crystal 5 of FIG. 1 of the main application. In addition, the phases of the alternating voltages applied to the crystal 5 and to its mirror image automatically are identical. Hence, no adjusting difficulties will occur.

In an embodiment in which the crystals 5 and 8 consisted of potassium dideuterium phosphate (KDDP), $V=V'=4$ kv. The wavelength $\lambda$ of the radiation was 6,328 AU.

Obviously, in general an apparatus according to the main application which includes $(2n-1)$ crystals (where $n \geq 2$) can be replaced by an apparatus which includes $n$ crystals followed by a retrodirective element.

In the apparatus shown in FIG. 2 radiation which is emitted from a source of light 21 and is converted into a parallel beam by a lens 22 falls on a polarizer 23. After passing through a semitransparent mirror 24 the linearly polarized beam traverses a series arrangement of a $\lambda/4$ plate 25 and a Pockels crystal 27 the principal directions of which, which are indicated by arrows 26 and 28 respectively, are at an angle of 45° to one another.

The radiation emerging from the crystal 27 is reflected at a plane mirror 30. The radiation then traverses the crystal 27 and the $\lambda/4$ plate 25 in the opposite direction and is reflected to a photoelectric detection system 31 by the semitransparent mirror 24.

To the crystal 27 there is applied from a source 29 a sawtooth voltage in which the difference between the maximum and minimum values is such as to produce a phase difference of one-half wavelength between the two oscillations which are created from linearly polarized light on its passage through the crystal 27.

The crystal 27 together with its mirror image with respect to the reflector 30 may again be considered as one crystal.

The apparatus shown in FIG. 2 has the same properties as the apparatus shown in FIG. 4 of the main application, for the $\lambda/4$ plate 25 corresponds to the $\lambda/4$ plate 25 of FIG. 4, the crystal 27 together with its mirror image corresponds to the crystal 26 of FIG. 4 and the mirror image of the $\lambda/4$ plate 25 corresponds to the $\lambda/4$ plate 27 of FIG. 4.

The difference between the maximum and minimum values of the sawtooth voltage applied to the crystal 27 is only one half of the corresponding difference of the voltage applied to the crystal 26 of FIG. 4 of the main application.

Apart from a plane mirror a so-called "cat's eye" may be used as the retrodirective element. A cat's eye is composed of a lens and a plane or concave mirror located in the focal plane of the lens.

What is claimed is:

1. An apparatus for converting radiation having an arbitrary plane of polarization into linearly polarized radiation having a plane of polarization varying linearly with time with respect to an initial arbitrary orientation, comprising polarizing means in the path of a beam of radiation having an arbitrary plane of polarization for converting the plane of polarization of the beam into a linearly polarized beam having a stationary plane of polarization, a first birefringent element in the path of the plane polarized radiation from the polarizer, an electro-optical crystal in the path of the radiation from the polarizer and having a principal direction displaced 45° with respect to the principal direction of the birefringent element, a retrodirective element in the path of the radiation passing through the birefringent element and the electro-optical crystal and oriented with respect to the beam of radiation in such a direction as to reflect the radiation back through the electro-optical crystal and the birefringent element, and a source of alternating voltage applied across the electro-optical crystal.

2. An apparatus as claimed in claim 1 wherein the birefringent element comprises a λ/4 plate.

3. An apparatus as claimed in claim 1 wherein the birefringent element is an electro-optical crystal.

* * * * *